Figure 1:
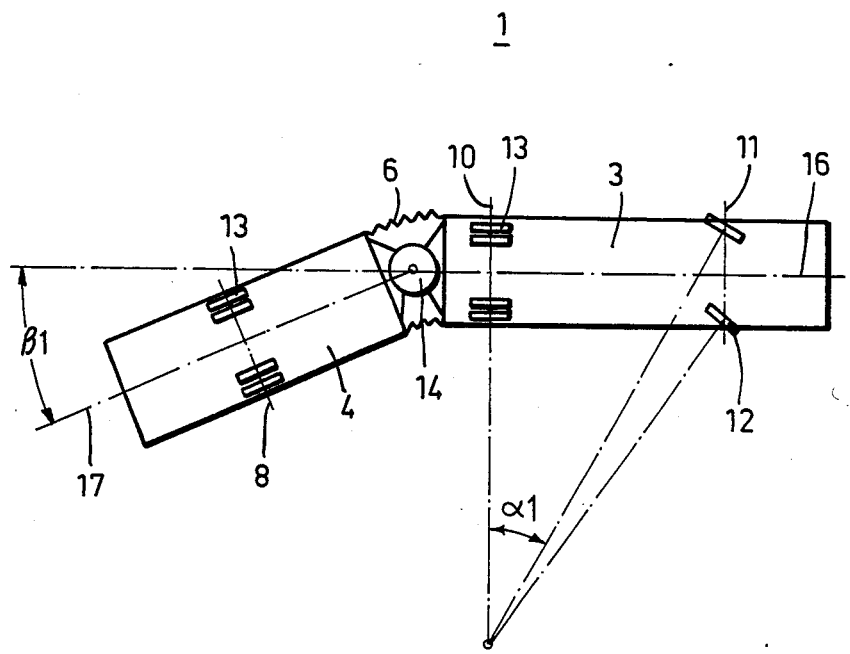

United States Patent [19]

Grassmuck

[11] Patent Number: 4,688,818
[45] Date of Patent: Aug. 25, 1987

[54] METHOD FOR REGULATING THE BENDING STABILITY OF ROAD VEHICLES

[76] Inventor: Juergen Grassmuck, Oeltingsallee 27, D-2080 Pinneberg, Fed. Rep. of Germany

[21] Appl. No.: 604,628
[22] PCT Filed: Aug. 18, 1983
[86] PCT No.: PCT/DE83/00143
    § 371 Date: Apr. 16, 1984
    § 102(e) Date: Apr. 16, 1984
[87] PCT Pub. No.: WO84/00730
    PCT Pub. Date: Mar. 1, 1984

[30] Foreign Application Priority Data
Aug. 18, 1982 [DE] Fed. Rep. of Germany ....... 3230617

[51] Int. Cl.$^4$ ............................................. B62D 53/04
[52] U.S. Cl. ..................................... 280/432; 180/135; 280/446 B
[58] Field of Search ................ 180/134, 135; 280/432, 280/492, 493, 494, 446 B, 400, 442, 426

[56] References Cited

U.S. PATENT DOCUMENTS

| | | | |
|---|---|---|---|
| 4,106,792 | 8/1978 | Schultz | 280/432 |
| 4,313,616 | 2/1982 | Howard | 280/446 B |
| 4,344,640 | 8/1982 | Ratsko | 280/432 |
| 4,365,685 | 12/1982 | Ratsko | 180/135 |
| 4,455,035 | 6/1984 | Ivony | 280/432 |

FOREIGN PATENT DOCUMENTS

| | | |
|---|---|---|
| 46484 | 3/1982 | European Pat. Off. . |
| 69107 | 1/1983 | European Pat. Off. . |
| 2547487 | 4/1977 | Fed. Rep. of Germany ...... 180/135 |
| 3048186 | 9/1981 | Fed. Rep. of Germany ...... 280/432 |
| 3204728 | 10/1982 | Fed. Rep. of Germany ...... 280/432 |
| 3218070 | 12/1982 | Fed. Rep. of Germany ...... 280/432 |
| 2069428 | 8/1981 | United Kingdom ................ 280/400 |
| 2082522 | 3/1983 | United Kingdom ................ 280/432 |
| 2082523 | 3/1983 | United Kingdom ................ 280/432 |

*Primary Examiner*—John J. Love
*Assistant Examiner*—Everett G. Diederiks, Jr.
*Attorney, Agent, or Firm*—Andrus, Sceales, Starke & Sawall

[57] ABSTRACT

A method for regulating the bending stability of road vehicles with at least two vehicle parts linked by an articulation as well as an articulation unit with an articulation operable by means of a hydraulic adjusting assembly and a hydraulic control mechanism controllable by an electronic computer with check valves arranged in a hydraulic circuit and at least one damping valve. For the steering angles possible with a stable travel state firstly the relevant articulation is determined and then when travelling a check is repetitively made after a predetermined distance to establish whether the articulation angle predetermined at the start of the journey as a function of the steering angle corresponds to the articulation angle at the end of the journey. If there is a divergence between the actual value of the articulation angle and the desired value of the articulation angle change, the articulation is controlled in such a way that the actual value of the articulation corresponds to its desired value, after taking account of the permitted tolerances.

6 Claims, 15 Drawing Figures

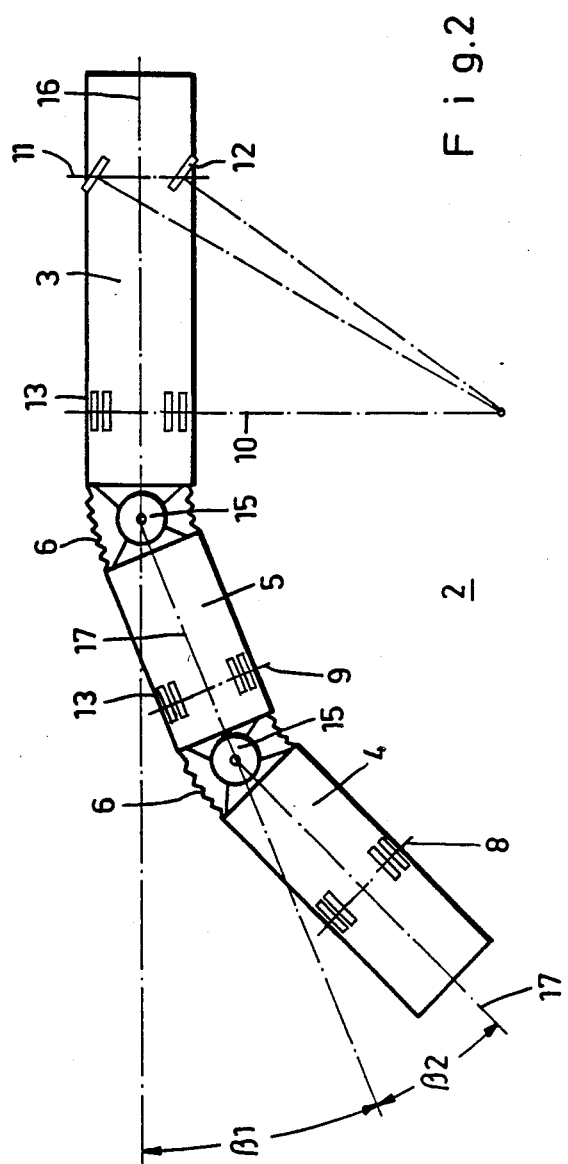

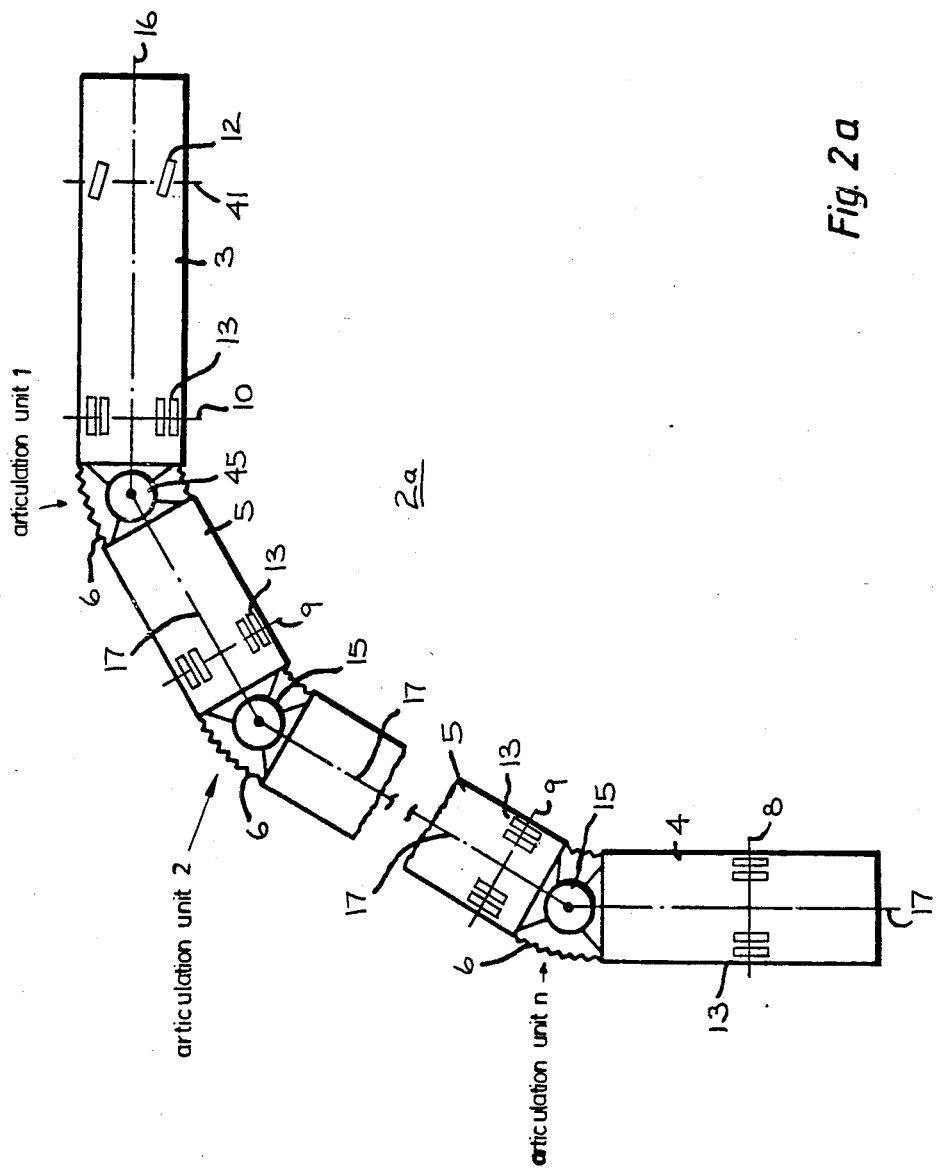

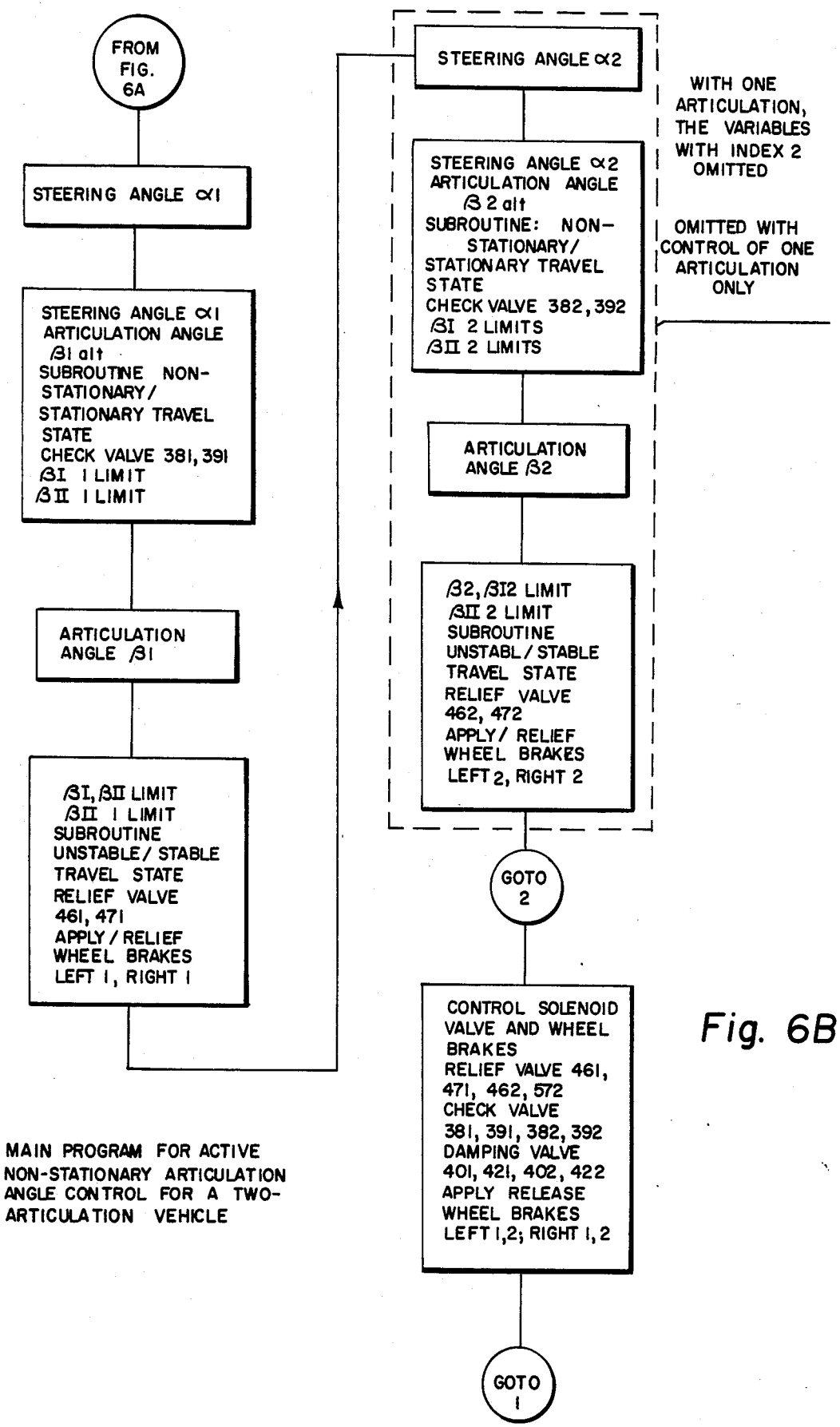

METHOD FOR REGULATING THE BENDING STABILITY OF ROAD VEHICLES

The present invention relates to a method for regulating the bending stability of road vehicles with at least two vehicle parts connected by an articulation unit, whereby said vehicle parts can be in a stationary, nonstationary, stable or instable travelling state, and an articulation unit with an articulation operable by means of hydraulic adjusting means and a hydraulic control mechanism controllable by means of an electronic computer with check valves arranged in the hydraulic circuit and at least one damping valve for performing the method.

In the case of single-articulation road vehicles, in which the drive is positioned in the rear, the disadvantage occurs that when cornering on icy roads, the thrust exerted on the rear axle attempts to increase the bending angle between the vehicle parts. When travelling in a straight line, at around 100 km/h instabilities occur even under normal road con ions, as a result of vehicle and steering momentums. In the case of multiple-articulation road vehicles, such unstable travelling states occur even at lower speeds. As this can lead to critical driving situations, it has been proposed for single-articulation vehicles to interconnect the vehicle parts by means of a swivel joint, which has a locking mechanism. The control part of the latter comprises a potentiometer in the articulation, as well as a potentiometer which is driven by the steering system and an electronic regulator, which compares the potentiometer voltages. If the voltage value associated with the joint is higher than the value associated with the steering system, the regulator provides the hydraulic control unit with an instruction to operate the articulation lock.

The disadvantage of this known mechanism is that a correcting measure can only be carried out on exceeding the bending limit for stationary circular travel. By then, valuable time has elapsed and the tail of the vehicle has taken up kinetic energy, which must be dissipated in order to bring the vehicle under control again. Therefore, instabilities can occur in the case of single-articulation vehicles at higher speeds, which can no longer be compensated by the control mechanism. In the case of two-articulation and multiple-articulation vehicles, the known mechanism is unsuitable, because up to the time of exceeding the bending limit for stationary circular travel, as a result of its length, the vehicle has taken up so much energy and is in a skidding state, that the hydraulic means are no longer in a position to dissipate this energy and consequently the vehicle goes out of control.

The object of the present invention is to provide a method for regulating the bending stability of multiple-articulation vehicles, which permits a faster and more accurate regulation of the bending stability, so that a stable travelling state is ensured, even at high speeds.

According to the invention, this object is achived in that firstly the associated articulation angle $\beta i$ for the steering angle $\alpha i$ possible under stable travelling conditions is determined. While travelling, the articulation angle is then repeatedly checked after a predetermined distance $\Delta s$ to establish whether the articulation angle $\beta i$ predetermined at the start of the distance $\Delta s$ as a function of the particular steering angle $\alpha i$ corresponds to the articulation angle which actually occurs at the end of the distance $\Delta s$. If the actual value for the articulation angle differs from the desired value of the articulation angle, the predetermined hydraulic functions for follow-up are performed until, while taking account of the permitted tolerances, the actual value of the articulation angle corresponds to the desired value thereof. If the articulation angle passes above or below permitted tolerance limits $\beta$I limit, $\beta$II limit, then measures are taken preventing an incorrect movement direction and which permit or assist the reaching of the desired travelling state. As a function of the selected steering angle, a specific articulation angle is always predetermined and after a fixed travel distance $\Delta s$, is compared with the then prevailing articulation angle. Variations occur, and it is only necessary to have limited locking or follow-up by means of the regulating or control mechanism. As a result of this refinement of the regulating stages, it is possible to detect an unstable state of the vehicle at an early stage, which makes rough actions of the hydraulic control mechanism unnecessary.

According to a development of the invention, the articulation unit control means are constructed as hydraulic, double-acting cylinders and an electronic control mechanism. The electronic control mechanism has has a microprocessor or a microprocessor circuit, which is in operative connection with a nonvolatile memory for storing the characteristic field, $\Delta\beta i = f(\beta i, \alpha)$, in which $\beta i$ is the articulation angle, $\alpha$ the steering angle and $\Delta\beta i$ the change to the articulation angle $\beta i$ after a distance $\Delta s$, in the case of a specific angle $\alpha$ at the start of the particular travel distance. In order to return the vehicle to the stable state, the double-acting cylinders produce a moment. Independently of the travel state, a braking of the wheel on the inside of the curve is used for increasing the moment produced. The larger the articulation angle, the larger the effective moment arm of the braking wheel.

Further features of the invetion are described hereinafter relative to embodiments of articulation units and in the attached drawings, show:

FIG. 1 a single-articulation road vehicle with the articulation unit according to the invention in a diagrammatic plan view.

FIG. 2 a two-articulation road vehicle with articulation units according to the invention in a diagrammatic plan view.

FIG. 2a a multiple-articulation road vehicle with articultion units according to the invention in a diagrammatic plan view.

Figure 2B:
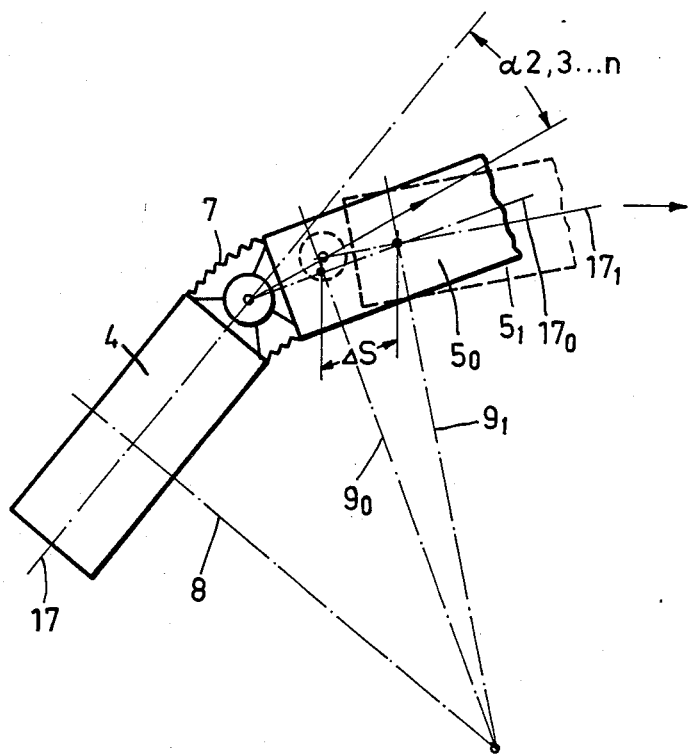

FIG. 2b the rear part of a multiple-articulation road vehicle with the representation of the steering angle.

Figure 3:
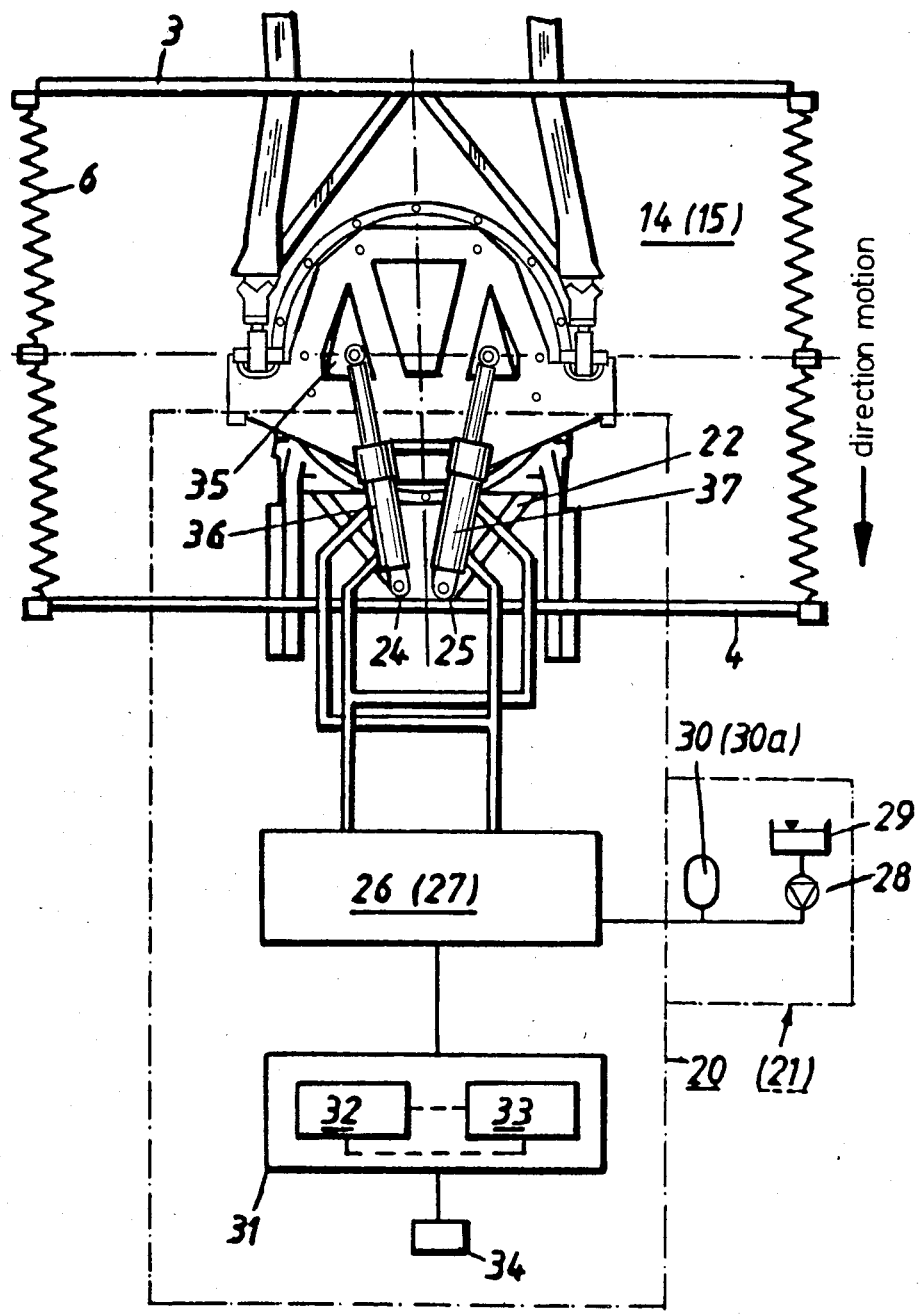

FIG. 3 an articulation unit according to the invention in a diagrammatic view.

Figure 3A:
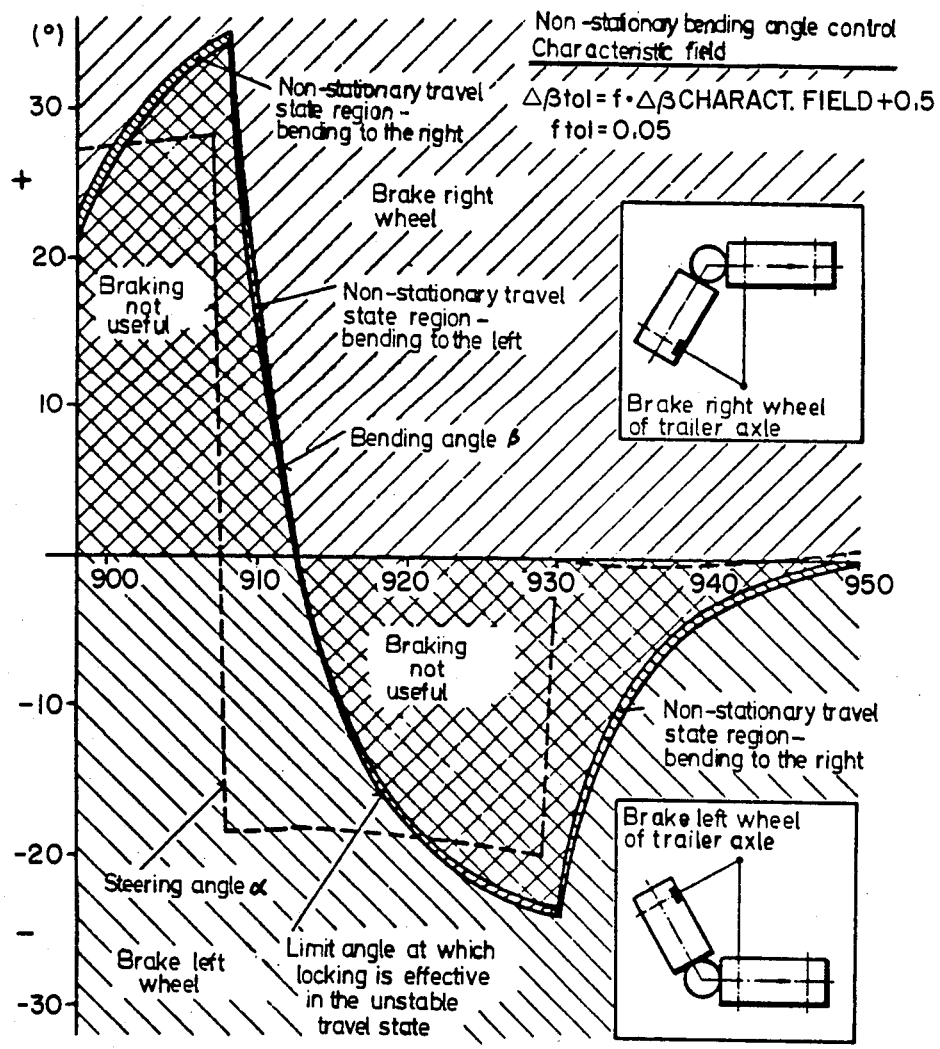

FIG. 3a a graph illustrating the conditions for the braking of the wheel on the inside of the curve of the axle following the articulation.

Figure 4:
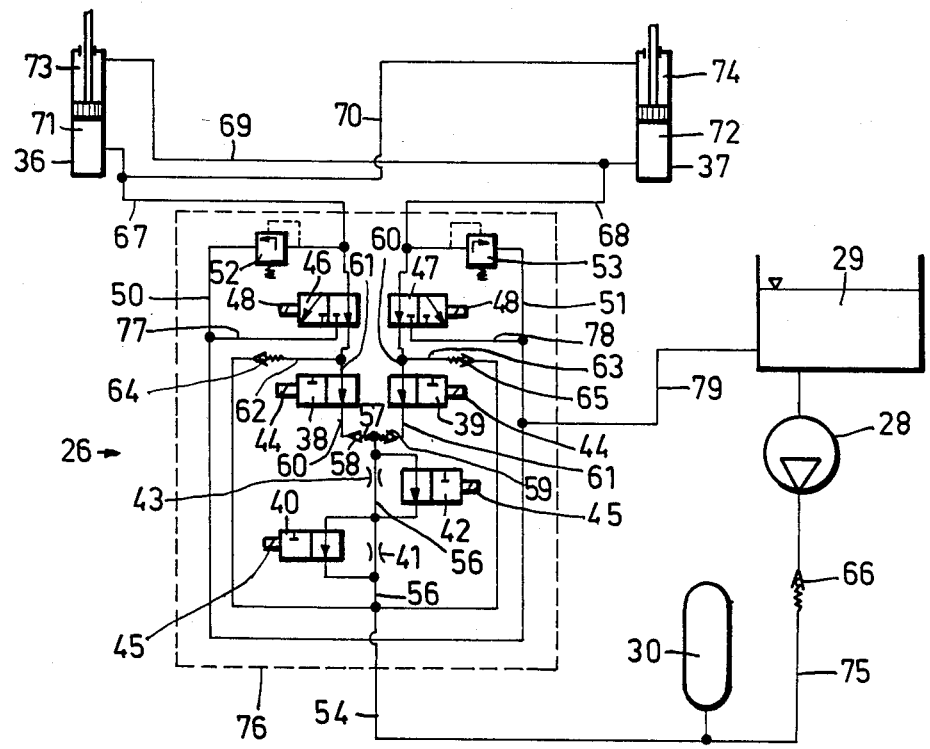

FIG. 4 a block circuit diagram of a construction of the hydraulic control mechanism of the articulation unit according to FIG. 3 and as an active control.

Figure 5:
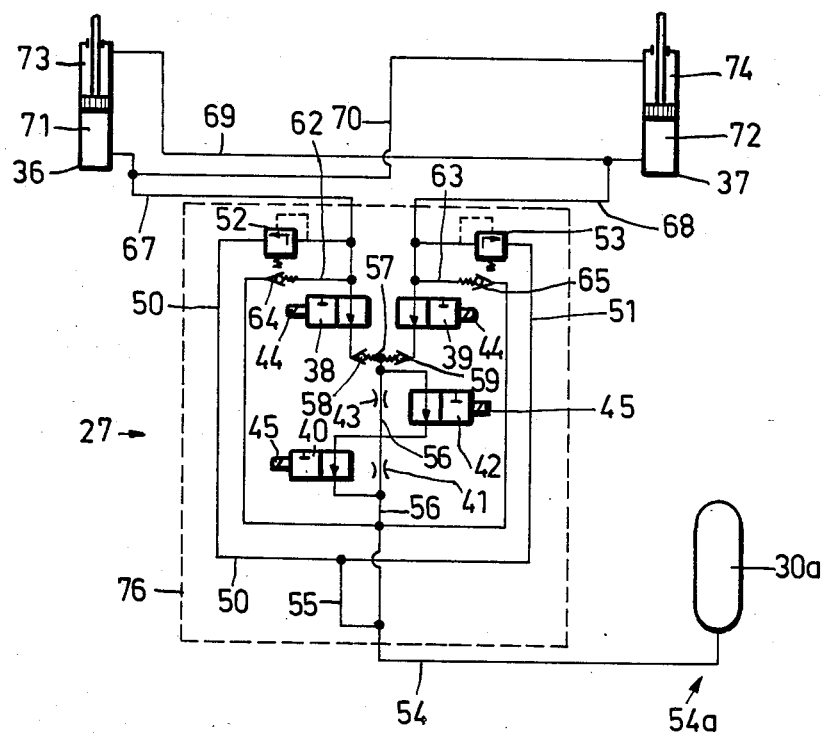

FIG. 5 a block circuit diagram of a further construction of a hydraulic control mechanism for an articulation unit as a passive control.

Figure 6A:
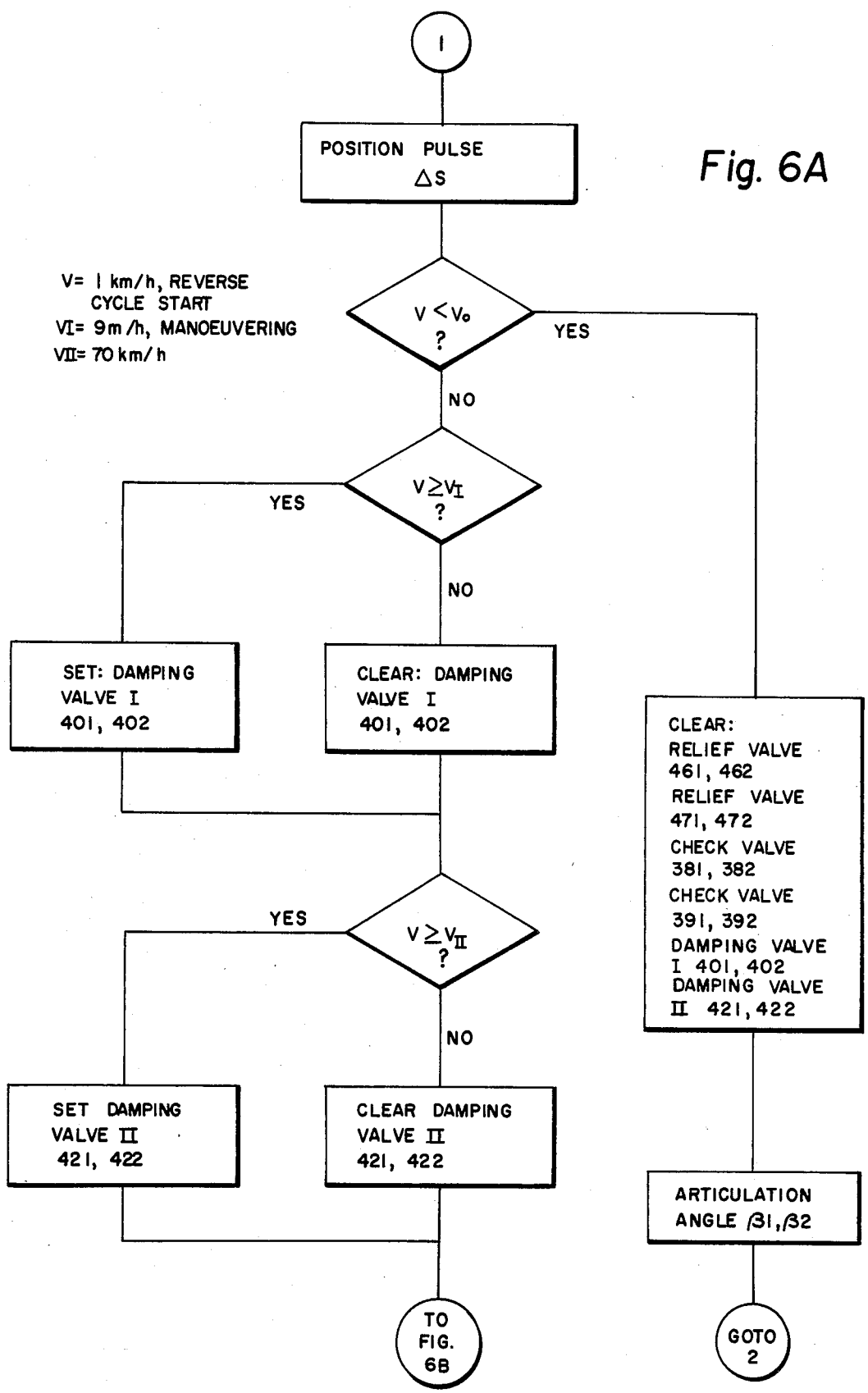

FIGS. 6A and 6B flow charts of the electronic computer of the articulation unit according to FIG. 3 for an active non-stationary articulation angle control for multiple-articulation road vehicles.

Figure 7:
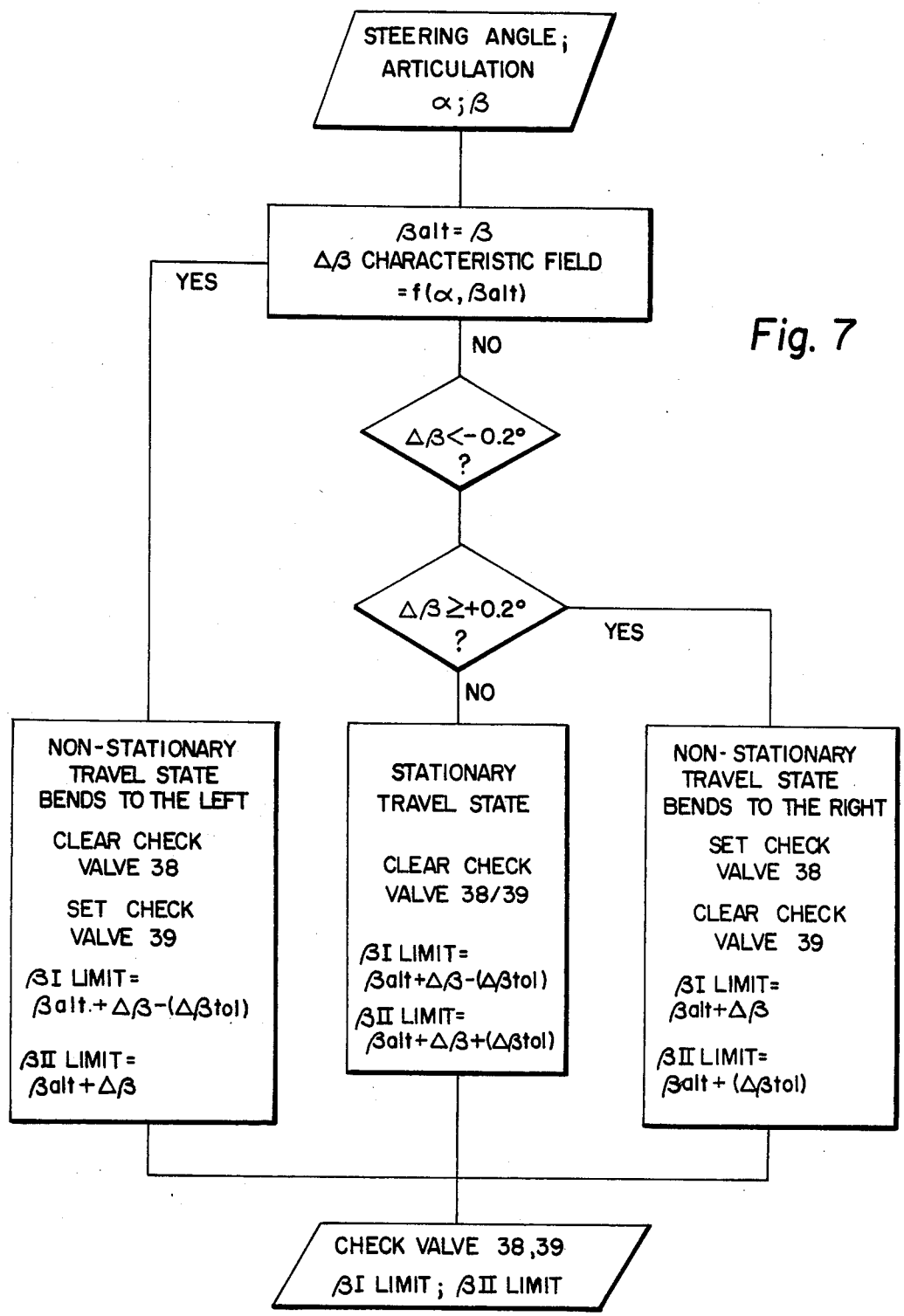

FIG. 7 a flow chart of the subroutine of the electronic computer for a stationary and a non-stationary travelling state.

Figure 8:
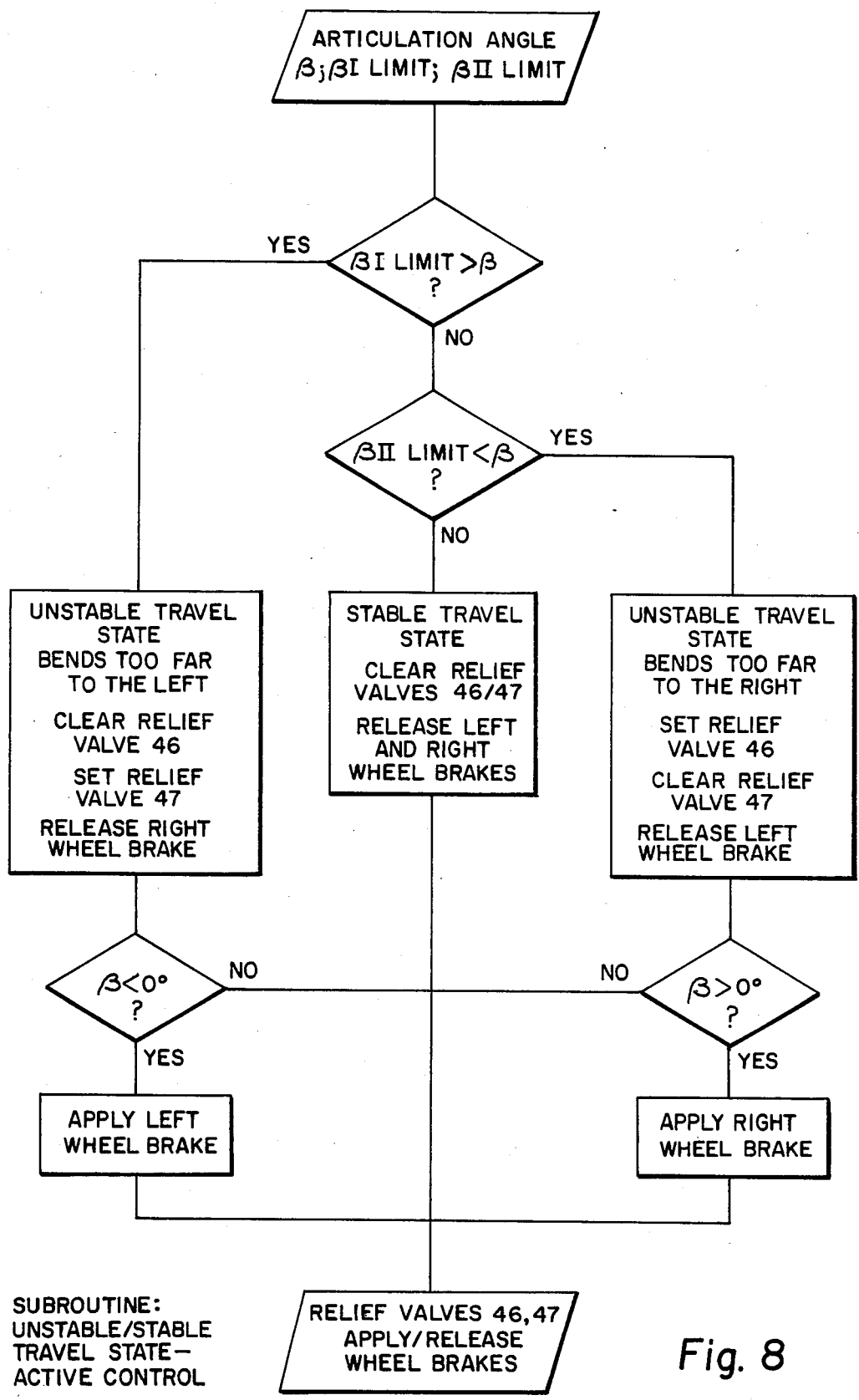

FIG. 8 a flow chart of the subroutine of the electronic computer for an active control in the unstable or stable travelling state.

Figure 9:
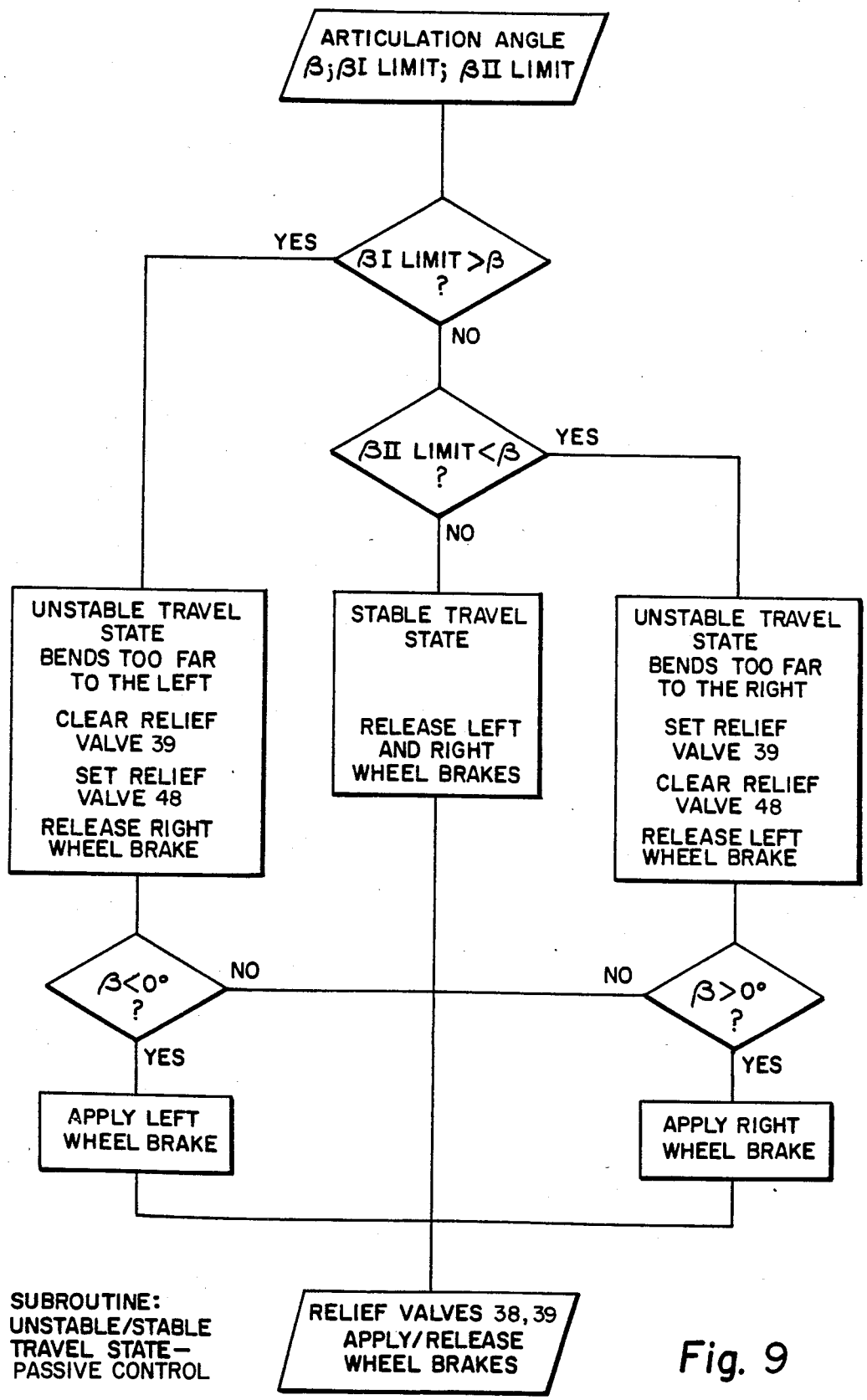

FIG. 9 a flow chart of the subroutine of the electronic computer for a passive control with unstable or stable travelling state.

Figure 10:
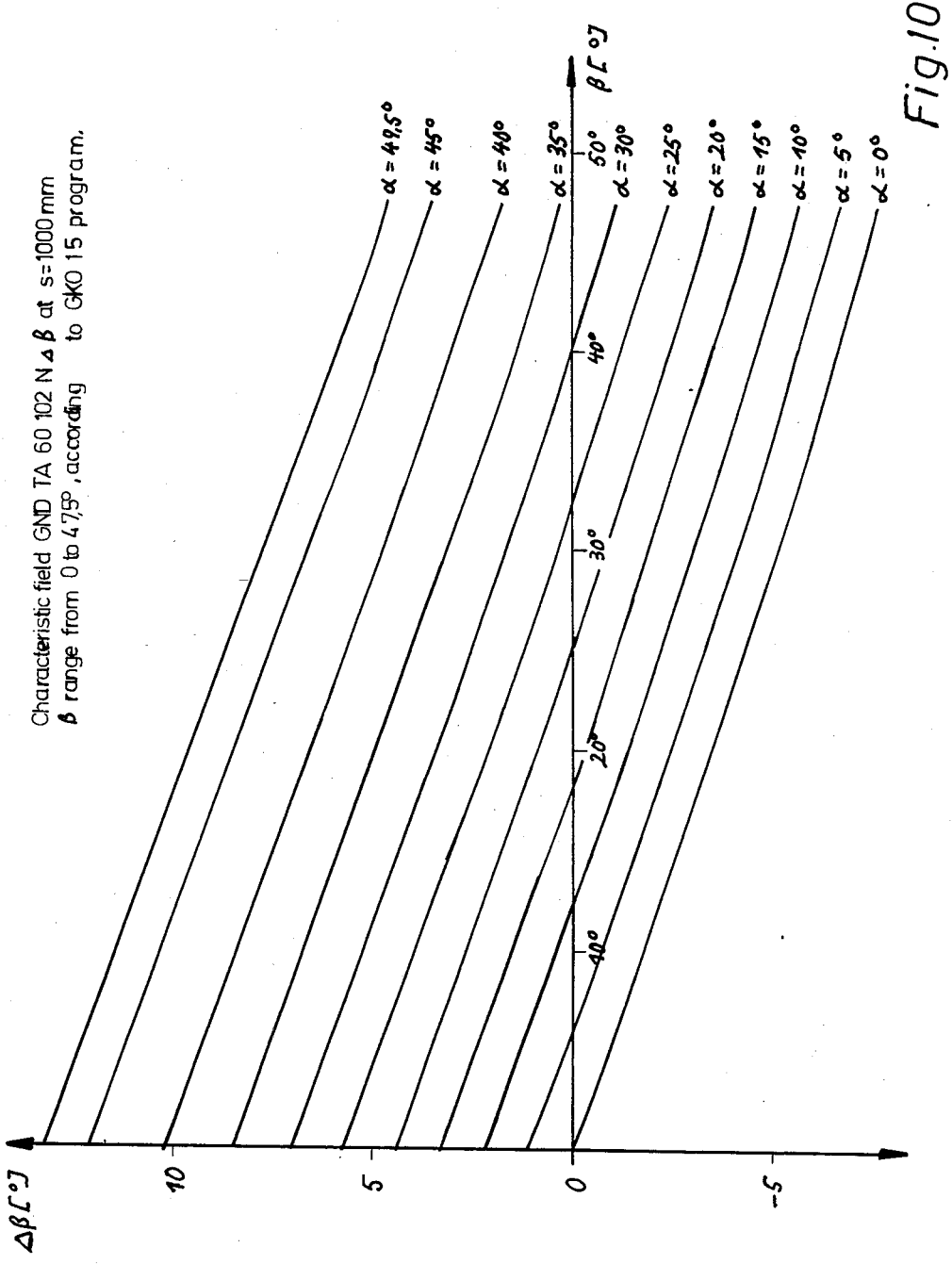

FIG. 10 an example for the characteristic field of the articulation angle changes to be read into a non-volatile memory of the microprocessor.

Figure 11:
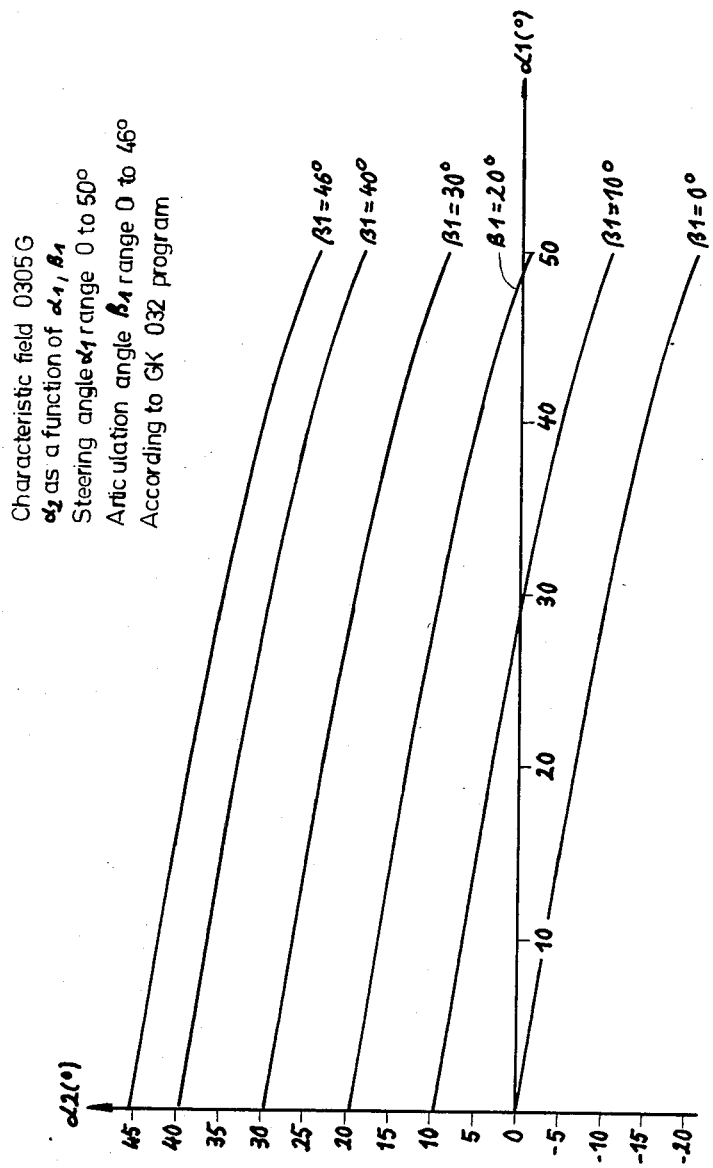

FIG. 11 an exemplified representation for the characteristic field of the articulation angle $\alpha 2$ to be read into a non-volatile memory of the microprocessor as a function of the steering angle $\alpha 1$ and the articulation angle $\beta 1$.

FIGS. 1, 2 and 2a, respectively show a single-articulation road vehicle 1, a two-articulation road vehicle 2 and a multiple-articulation road vehicle 2a in a diagrammatic plan view. They have a front vehicle part 3, which is followed by a trailer 4, or two trailers 4, 5, or several trailers 4, 5, 5, etc. The connection between the front vehicle part 3 and the trailers 4, 5 is provided by means of swivel joints 14, 15. Laterally with respect to the swivel joints 14, 15 are provided bellows-like connecting walls 6, which interconnect the individual vehicle parts and deform in the case of articulating movements of single-articulation road vehicle 1, two-articulation road vehicle 2, or multiple-articulation road vehicle 2a. In each case, the trailers 4, 5 have an axle 8, 9 with fixed vehicle wheels 13. The front vehicle part has two fixed vehicle wheels 13 on a rear axle 10 and steerable vehicle wheels 12 on the front axle 11. Steering angle $\alpha 1$ exists between the steerable vehicle wheels 12 of front axle 11 and rear axle 10 when travelling round corners. Steering angles $\alpha 2, \alpha 3, \ldots \alpha n$ are determined between the longitudinal axis of the following vehicle part and the direction of travel and the direction motion at the joint. They can be measured by sensors. It is possible to determine the steering angle $\alpha 4+1$ as a function of the variables $\alpha 1, \beta 1; \ldots \alpha n-1, \beta n-1$, the constant vehicle dimensions and the predetermined travel distance $\Delta s$. When the data for a vehicle type per articulation unit have been calculated, they can be combined in a characteristic field for determining the steering angle $\alpha i+1$ and fed into a non-volatile memory. This obviates the need for the sensors for measuring the steering angles $\alpha i+1$. It is useful to provide a levergear for measuring the steering angle $\alpha 1$ and this gear is operated by the transmission elements between the steering gear arm and the wheels. The lever gear is appropriately geared up. An asymmetry of the kinetics of the transmission elements between the pivotal point of the lever gear and the articulated wheels is compensated.

When travelling, states can occur which lead to the fluttering of the reference regulator. These states are caused by the fact that two voltages of the two potentiometers oscillate about the same mean value. This is due to the facts that the driver never holds the steering wheel completely steadily, the articulation angle never remains absolutely constant due to uneven road surfaces and vibrations of the vehicle lead to mechanical oscillations between the potentiometers and the working point of the lever gear. For the same actuation path of the steering, gearing up leads to larger angular changes and consequently to larger voltage changes of the potentiometers, which leads to a reduction the sensitivity to fluttering phenomena.

When cornering, an articulation angle $\beta 1, \beta 2$ or $\beta n$ occurs at each swivel joint 14, 15. Articulation angle $\beta 1$ is the angle occurring between longitudinal axis 16 of the front vehicle part and longitudinal axes 17 of the trailer during cornering by vehicles 1 or 2 or 2a. Articulation angle $\beta 2$ or $\beta n$ is the angle formed between the longitudinal axes 17, 17 of the trailers when the two-articulation road vehicle or multiple-articulation road vehicle 2a is cornering. The articulation angles can be measured by means of sensors, which are operable by lever gears. The latter bring about gearing up, or have a transmission rate of 1:1. Each of the swivel joints 14, 15 is provided with an articulation unit 20, 21. For the constructional reasons described hereinafter, articulation unit 20 is particularly suitable for a swivel joint 14 of a single-articulation road vehicle 1, whereas articulation unit 21 is preferably used for swivel joints 15 of two-articulation road vehicles 2 or multiple-articulation road vehicles 2a.

The regulation or control of the bending stability according to the invention is also possible with multiple-articulation road vehicles, one of which is diagrammatically shown in FIG. 2a. FIG. 2b shows the rear part of such a vehicle 2a with a representation of the steering angle $\alpha 2, \alpha 3 \ldots \alpha n$. The direction motion is represented at the pivotal point of the rear part of the vehicle. It is made apparent by the connecting lines of the pivotal points before and after the distance $\Delta s$. As the pivotal point projects beyond the rear axle of the "preceding" vehicle, the pivotal point swings out opposite to the curve direction.

FIG. 3 diagrammatically shows an articulation unit 20, 21, comprising hydraulic double-acting cylinders 36, 37, arranged centrally on the transverse beam in front of joint 35. The spacing of the articulation points 24, 25 of cylinders 36, 37 on the transverse beam is kept small, because the force components are subtracted in the longitudinal direction of the vehicle. The piston rods act on the transverse beam of the ring mount. Cylinders 36, 37 are connected to a hydraulic control mechanism 26, 27, whose operating elements are operable by an electronic computer 31, as a function of the vehicle type and travelling state. Electronic computer 31 has a microprocessor 33, which is connected to a non-volatile memory 32 FIGS. 6A and 6B flow charts. Microprocessor 33 is also connected to an adjusting and testing device 34, which enables the microprocessor 33 to be programmed. Device 34 also makes it possible to carry out a diagnosis on articulation unit 20, 21 for maintenance purposes. Moreover, memory 32 can be supplied with data via the adjusting and testing device 34. While hydraulic control mechanism 26 of articulation unit 20 is connected to a pressure increasing pump 28 and a fluid collector 29, these components are not provided for the hydraulic control mechanism 27 of articulation uit 21.

The dependence of the articulation angle on the steering angle is plotted over a travel distance in FIG. 3a. As the force direction of the braking wheel produces a moment, which attempts to reduce the articulation angle, braking is only effective if it makes it possible to retore the stable travelling state. In addition to the predetermined hydraulic functions, the wheel brakes of the wheels on the inside of the curve are operated if in the case of an articulation angle to the right, the articulation bends too far to the right, or in the case of an articulation angle to the left, the joint bends too far to the left. This more particularly takes place when joint 35 bends over and beyond a predetermined articulation angle $\beta i$, the wheel brakes of the wheels on the inside of the curve on the axle following the particular articulation being operated in addition to the check valves 38, 39 or the relief valves 46, 47. This permits a functional connection with per se known antilocking systems.

As shown in FIG. 4, the hydraulic control mechanism 26 comprises a control unit, in which are arranged the damping valves 40, 42, check valves 38, 39, relief valves 46, 47 and pressure limiting valves 52, 53. Damping valves 42, 40, check valves 38, 39 and relief valves 46, 47 are constructed as solenoid valves and have for respective operation purposes, adjusting members 45, 44, 48 controllable from the microprocessor 33. For pressure supply purposes, a pressure increasing pump 28 is provided, which is formed in a pressure line 75, which has a non-return valve 66 and is connected to the fluid collector 29. At the other end portion of pressure line 75 there is a pressure storage device 30 which can be designed for a pressure of e.g. 220 bar. A further pressure line 54 is connected to pressure line 75 and is introduced into a casing 76 of the hydraulic control mechanism 26 and passes into line portions 56, on which is provided two by-pass lines, each containing one damping valve 40, 42, which is in each case constructed as a two way valve. Line portions 56 in each case contain chokes 41, 43 paralle to damping valves 40, 42.

In the end part of one line portion 56 is constructed a branch 57, to which are connected two parallel connecting lines 60, 61, each of which contains a non-return valve 58, 59 and a check valve 38, 39, the latter also being constructed as two way valves. At the outlet of check valves 38, 39, one end of a by-pass line 62, 63 with a non-return valve 64, 65 is connected to connecting line 60 61. The other ends of bypass lines 62, 63 are connected and upstream of the damping valves 40, 42 are to a line portion 56. Connecting line 60, 61 is connected to a pressure line 67, 68, in which is incorporated a relief valve 46, 47. Between relief valve 46, 47 and hydraulic cylinders 36, 37, a branch line 50, 51 with a pressure limiting valve 52, 53 is connected to pressure lines 67, 68. Branch lines 50, 51 are closed to form a circuit and are connected with the fluid collector 29 across a return line 79. In the same way, each relief valve 46, 47 with an outlet is connected via a connecting line 77, 78 to the branch line 50, 51. Pressure line 67 is joined to the pressure chamber 71 of the top of the piston of cylinder 36 and via a branch line 70 to the pressure chamber 74 of the bottom of the piston of cylinder 37. The other line 68 is connected to the pressure chamber 72 of the top of the piston of cylinder 37 and via branch line 69 to the pressure chamber 73 of the bottom of the piston of cylinder 36. This ensures that the hydraulic streams are summed in the case of a bending in of the joint or articulation.

As shown in FIG. 5, the hydraulic control mechanism 27 has no relief valves 46, 47 with connecting lines 77, 78, while fluid collector 29 and pressure increasing pump 28 are also omitted. The pressure storing device 30a can be designed for much lower pressures, such as e.g. 11.5 bar. Since, due to the omission of a hydraulic pressure producing mechanism, the hydraulic control mechanism can only perform a passive contro. It also possible to adapt the hydraulic connections to cylinders 36, 37 and the pressure limiting valves 52, 53. However, hydraulic control mechanism 26 permits an active articulation control. On controlling the relief valves 46, 47, the prestressing pressure of hydraulic cylinders 36, 37 is relieved on one side. The prestressing pressure on the other piston side exerts an active torque action on articulation joint 35. As a result of the use of stored energy, it is possible to even more effectively combat an unstable travelling state. On controllingdheck valves 38, 39, the movement of articulation joint 35 is always blocked in one direction. On controlling damping valves 40, 42 the chokes 41, 43 become active due to the displacement of the volume from one side of the piston to the other. The flow cross-sections of chokes 41, 43 are chosen in such a way that the dissipation of energy corresponds to the speed ranges of e.g 9 to 70 km/h and 70 km/h to maximum speed. In the case of damping for the speed range 70 km/h to maximum speed, damping for the speed range 9 to 70 km/h remains connected in.

Relief valves 46, 47 only come into action in an unstable travelling state (skidding). As this state only occurs very rarely, the period during which the pressure increasing pump is connected in and consequently the energy consumption are very low. The pressure storing device 30, which can be constructed as a bubble store, is appropriately dimensioned in such a way that at least one articulation movement of 45° can be performed, without the pressure increasing pump 28 having to effect a replenishing action.

While the active articulation control with a hydraulic control mechanism 26 is absolutely necessary for safety reasons in the case of a two-articulation road vehicle 2 and multiple-articulation road vehicle 2a, in the case of a single-articulation road vehicle 1, there can be both an active articulation control with a hydraulic control mechanism 26 and a passive articulation control with a hydraulic control mechanism 27. However, in all cases, for the purpose of reducing the control activities by the electronic computer 31, it is recommended that microprocessor 33 be operated at a frequency, which is a multiple of the position pulse.

The necessary actions for a non-stationary articulation control in the individual travelling states are shown in the following table.

| | Active influencing of articulation movement by control forces of hydraulic cylinder under unstable travelling conditions, passive influencing under stable traveling conditions. | | Passive influencing of articulation movement by damping and blocking the hydraulic flow. |
|---|---|---|---|
| | Multiple-articulation road vehicle "active" (1) | Single-articulation road vehicle "active" (2) | Single-articulation road vehicle "passive" (3) |
| 1. Stationary travelling state | Damping I or I + II, as a function of speed/articulation | Like (1) | Like (1) |
| 2. Non-stationary travelling state (most frequently occurring) | | | |

-continued

| | Active influencing of articulation movement by control forces of hydraulic cylinder under unstable travelling conditions, passive influencing under stable traveling conditions. | | Passive influencing of articulation movement by damping and blocking the hydraulic flow. |
|---|---|---|---|
| | Multiple-articulation road vehicle "active" (1) | Single-articulation road vehicle "active" (2) | Single-articulation road vehicle "passive" (3) |
| 2.1. Bends left | as a function of articulation, block articulation movement to the right | Like (1) | Like (1) |
| 2.2. Bends right | as a function of the articulation movement, block articulation to the left | Like (1) | Like (1) |
| 3. Stable travelling state | No action | No action | No action |
| 4. Unstable travelling state(seldom occurs; only with loss of the lateral guidance force of axles - ice, etc) | | | |
| 4.1. Articulation movement too far to the left | actively force articulation movement to the right by control forces of hydraulic cylinders and braking of left wheel of trailer axle | As (1) | Block further articulation movement to the left and braking left wheel of trailer axle |
| 4.2. Articulation movement too far to the right. | Actively force articulation movement to the left by control forces of hydraulic cylinders and braking of right wheel of trailer axle. | As (1) | Block further articulation movement to the right and braking right wheel of trailer axle. |

The necessary program flow in the electronic computer 31 for controlling the hydraulic control mechanism 26, 27 is shown in the flow charts of FIGS. 6A, to 6B. Appropriately, the overall program is subdivided into a main program and various subroutines for non-statonary/stationary and unstable/stable travelling states. The main program can be used for controlling both one and two more articulation units 21, a repeat part of the main program being omitted when only one articulation is controlled. As shown in the flow chart of FIGS. 6A, 6B, in the case of an active nonstationary articulation angle control, the vehicle speed state is initially determined from the predetermined position pulses. In the first part, the program for an articulated bus with n-articulations processes:

articulation angles $\beta 1, \beta 2, \ldots \beta n$
damping valves (I) 401, 402, ... 40n
damping valves (II) 421. 422, ... 42n
relief valves 461, 462, ... 46n
relief valves 471, 472, ... 47n
check valves 381, 382, ... 38n
check valves 391, 392, ... 39n.

For each articulation unit, the program section shown by broken lines in FIG. 6B are suppled to the program. In a further program part according to FIG. 7, the associated articulation angle $\beta i$ is determined on the basis of the steering angle $\alpha i$ when cornering. On the basis of this articulation angle $\beta i$, the divergences of the existing articulation angle from the desired value are determined, check valves 38, 39 are controlled and optionally the wheel on the inside of the curve of the following axle is traked, in order to counteract the unstable articulation movement.

The active control in the case of an unstable/stable travelling state is controlled by means of the subroutine shown as a flow chart in FIG. 8. On the basis of the articulation angle $\beta i$ and the desired values $\beta i$ I limit and $\beta i$ II limit, a distinction is made between the stable (within the tolerance limits) and unstable travelling state (outside the tolerance limits), as a function of the bending direction of the articulation. By means of microprocessor 33, the relief valves 46, 47 of the hydraulic control mechanism 26 and optionally the wheels on the inside of the curves of the axles following the articulations, are operated, in order to counteract the unstable articulation movement. In the passive control embodiment, the check valves 38, 39 of the hydraulic control mechanism 27 are controlled and optionally the wheels on the inside of the curves of the axles following the articulations are operated, in order to counteract the unstable articulation movement.

In the case of a passive control of an articulation unit 20, in the case of an unstable/ stable travelling state, the subroutine shown in flow chart form in FIG. 9 is used. Once again, the electronic computer determines that the tolerance limits have been exceeded. In the same way as according to FIG. 8, the subroutine establishes the three states unstable travelling state/bends too far to the left, stable travelling state, and unstable travelling state/bends too far to the right. As a function of the particular situation, by means of control pulses from microprocessor 33, the check valves 38, 39 are operated and operationally the wheels on the inside of the curve of the particular following axle are braked, in order to counteract the unstable articulation movement.

FIG. 10 shows a possible characteristic field of the articulation angle change for a right-hand curve, which can be stored in the non-volatile memory 32 of electronic computer 31. This characteristic field must be individually determined for the particular vehicle type, into which the particular articulation unit 20, 21 is to be incorporated, one field being required per unit. The use of a characteristic field for several articulation units is possible, if the dimensions of the vehicle parts are identical.

FIG. 11 shows a possible characteristic field of steering angle $\alpha 2$ for a two-articulation road vehicle 2 for a right-hand curve, which can be stored in the non-volatile memory 32 of electronic computer 31. This characteristic field replaces a sensor for the measurement of steering angle $\alpha 2$. It can be used with particular advantage if the microprocessor can additionally deal with the calculation of the steering angle during the cycle time predetermined by the travelling speed and the distance $\Delta s$. This characteristic field must be individually determined for the particular vehicle type, into which the articulation unit 20, 21 is to be incorporated, one field being required for each unit. It is possible to use one characteristic field for several articulation units, if the dimensions of the vehicle parts are identical.

Through the modular construction of the individual components, articulation unit 20, 21 makes it possible to adapt to various uses. It is also possible to easily carry out system improvements by adapting components, while continuing to use the remaining components. Therefore, articulation unit 20, 21 can be used in the most varied single and multiple-articulation road vehicles.

I claim:

1. A method for regulating the bending stability of road vehicles with at least two vehicular portions connected by an articulation joint and capable of assuming steady, transient, stable, or unstable traveling states, said articulation joint having a pivot point and hydraulic function means for controlling an articulation angle occurring in the joint, said vehicle having the vehicular drive arranged in the trailing vehicular portion, said method comprising the steps of:

ascertaining a steering angle $\alpha$ comprising the angle between the longitudinal axis of the trailing vehicular portion and the extension of a line connecting the positions of the pivto point at the beginning and end of a predetermined vehicle travel distance $\Delta s$;

determining a respective associated articulation angle $\beta i$ for the steering angle $\alpha i$ possible with a stable traveling condition, the articulation angle comprising the angle between the longitudinal axes of the trailing and preceding vehicles;

determining steering angles $\alpha 2, \alpha 3 \ldots \alpha n$ as a function of variables $\alpha 2, \beta 2; \alpha 3, \beta 3; \ldots \alpha n-1, \beta n-1$, vehicle characteristic constants, and the predetermined travel distance $\Delta s$; the variables $\alpha 2, \beta 2 \ldots$, the vehicle characteristic constants, and the predetermined travel distance $\Delta s$ for the determination of the steering angle being correlated for a particular vehicular type and recallably stored as data in a memory;

repeatedly examining during the operation of the vehicle through said predetermined travel distance $\Delta s$, whether the articulation angle $\beta i$ predetermined in dependency on the respective steering angle $\alpha i$ at the beginning of the travel distance $\Delta s$ corresponds to the actual articulation angle existing at the end of the travel distance $\Delta s$;

ascertaining a deviation of the respective actual value of the articulation angle $\beta i$ from the desired value of the articulation angle $\beta i$; and controlling the articulation angle by means of said hydraulic function means to bring the actual value of the articulation angle $\beta i$ into correspondence with the desired value of the articulation angle $\beta i$ within allowable tolerance.

2. A method according to claim 1 further defined as measuring the steering angles $\alpha 2, \alpha 3, \ldots \alpha n$ by mean of sensors.

3. A method according to claim 2 wherein the vehicle has transmission elements between a steering gear arm and the vehicle wheels and a sensor operated by a lever coupled to said transmission elements, said method being further defined as measuring the steering angle by means of said lever operated sensor.

4. A method according to claim 1 wherei the determination of the respective of the associated articulation angle $\beta i$ is made by a computer.

5. The method according to claim 1 further defined as recallably storing the data necessary to determine the steering angle in a semiconductor memory.

6. A method according to claim 1 wherein the trailing vehicular portion has brakeable wheels arranged on opposite ends of an axle transverse to the longitudinal axis of the trailing vehicular portion and wherein the road vehicle traverses curves during travel, said method including the step of braking the wheel on the inside of the curve for controlling the articulation angle.

* * * * *